UNITED STATES PATENT OFFICE.

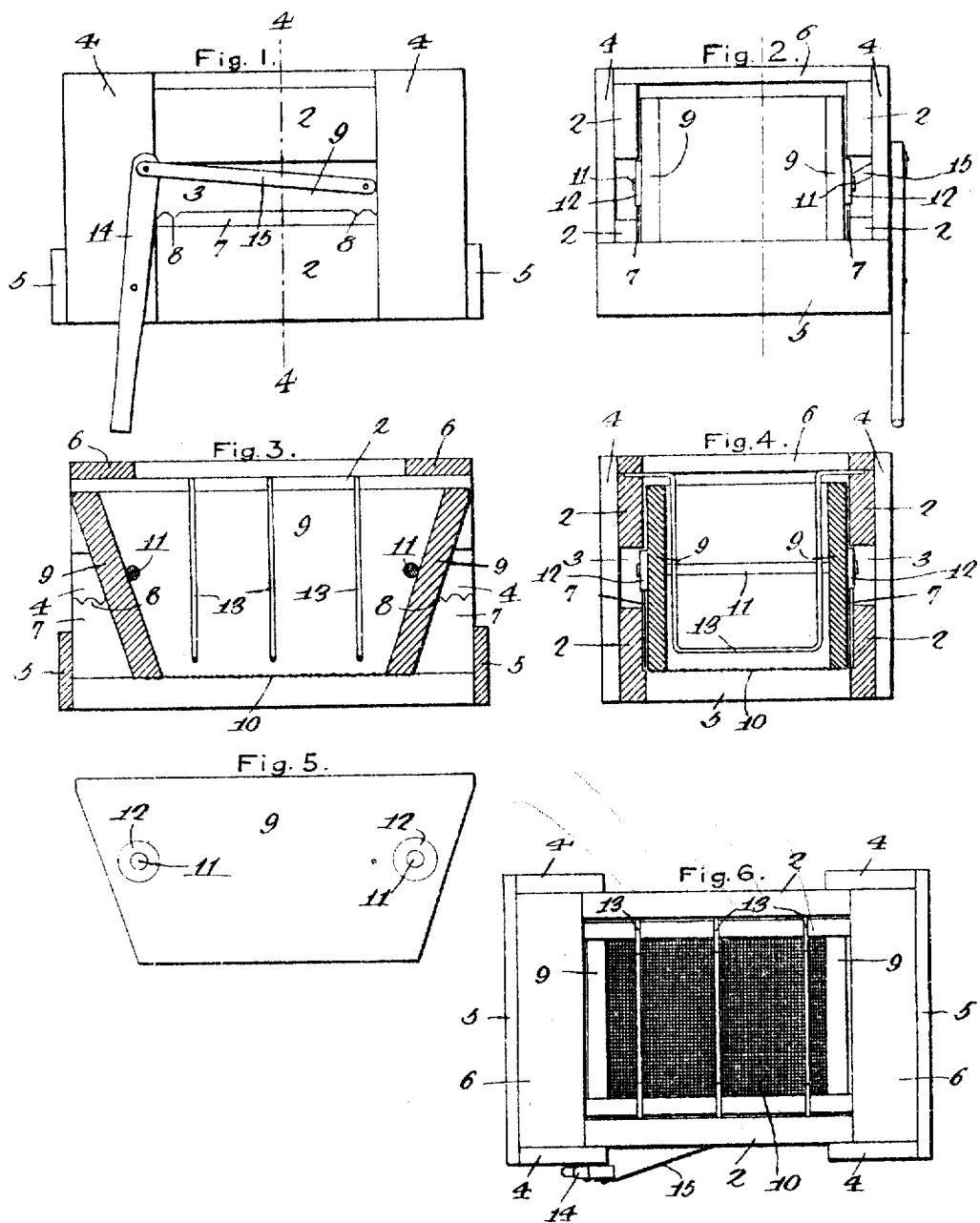

GEORGE A. HOOP, OF DE SOTO, MISSOURI.

FLOUR-SHAKER.

942,903.  Specification of Letters Patent. Patented Dec. 14, 1909.

Application filed December 14, 1908. Serial No. 467,511.

*To all whom it may concern:*

Be it known that I, GEORGE A. HOOP, a citizen of the United States, residing at De Soto, in the county of Jefferson and State of Missouri, have invented a new and useful Flour-Shaker, of which the following is a specification.

My invention relates to improvements in flour shakers or sifters designed to be used in sprinkling flour on the "forms" or dough used in the making of cakes, crackers or biscuits, and it has for its object the production of a device of this character which will evenly sprinkle or distribute the flour over the forms or dough so employed, and will effect an economy in the amount of flour used for this purpose, as well as a saving in time and labor. My said device is adapted to be suspended directly over the dough and to be operated with the minimum of manual labor.

With these and other objects in view my invention consists in the details of construction and combination of parts which will be hereinafter fully described and pointed out in the appended claim.

In the accompanying drawings illustrating the preferred embodiment of my invention, Figure 1 represents a view in elevation of the outer side of my device; Fig. 2 an end view thereof; Fig. 3 a longitudinal section; Fig. 4 a cross sectional view taken on line 4, 4 of Fig. 1; Fig. 5 a view in side elevation of the flour sprinkler, and Fig. 6 a top plan view of the device.

Like numerals designate the same parts wherever they occur.

The frame of the sifter is preferably made rectangular in form and open at its ends and top and bottom portions, and having its sides formed of slats or separated portions 2, 2, with the intervening space 3 between the same.

4, 4 designate upright pieces forming end portions of the structure and 5, 5 are base pieces extending across the ends of the structure and 6, 8 are strips extending across the top of the frame at the ends thereof.

All of the above enumerated parts are bolted or otherwise joined together, as may be found advantageous.

7, 7 designate tracks bolted or otherwise secured to the inside of the structure near the base thereof and on opposite sides thereof. These tracks are provided near their ends with a serrated portion 8 to effect a jarring movement of the flour container traveling thereon.

Mounted within the structure is a flour container 9 having a reticulated bottom 10 of the proper mesh. Through each end of the flour container 9 passes a shaft 11 on the ends of which are mounted wheels 12, so positioned as to cause them to rest and travel on the tracks 7. Supported within the frame are a series of U-shaped agitators or cleaners 13, having their lower or base portions extending down within the flour container 9 and resting upon the reticulated bottom 10 thereof. The cleaning or agitating devices 12 are journaled at their upper ends in the sides of the frame, whereby they are capable of a slight rocking movement in the reciprocation of the flour container into the interior of which they extend. As the flour container is reciprocated back and forth the agitators or cleaning devices 13 are caused to move over the surface of the reticulated bottom of said container in a direction opposite to the movement of the same, whereby they exert a dragging and crushing action on any lumps which may be contained in the flour, thereby crushing the same and causing them to pass through the interstices in the reticulated bottom of such container, such movement of the agitators being permitted by their pivotal connection at their upper ends with the sides of the frame 1.

Journaled on the side of the container is a hand lever 14, to the upper end of which is pivoted one end of a link 15 which is connected at its forward end to the side of the flour container 9. As will be seen, movement of the hand lever 12 causes the flour container to be reciprocated back and forth within the casing 1, its wheels 12 traveling on the tracks 7. The extent of the movement of the container 9 is limited by the end pieces 5, 5 with one of which it contacts at each end of its movement. In the actuation of the flour container 9 the agitators 12 rock on their pivots and serve to keep the flour from caking in the bottom of said container and also serve to keep the meshes of the reticulated or screen bottom of the container free from clogging.

As will be seen my device may be suspended in convenient position over the table containing the forms or dough on which it is desired that flour be sprinkled in proper quantity, by a spout having its mouth arranged above the container 8, and that upon moving the lever 13 the container 8 will be reciprocated back and forth and caused to sprinkle the flour in regulated quantity over the dough or forms beneath.

Having thus described my invention what I claim and desire to secure by Letters Patent is:

In a device of the character described the combination with a frame, trackways in said frame, a flour container having a reticulated bottom and adapted to be reciprocated on said trackways, a series of independently movable U-shaped agitators each pivotally mounted at its upper end on the frame and having its lower portion extending into the flour container, and means mounted on the frame and connected with the flour container to effect the reciprocation thereof.

GEORGE A. HOOP.

Witnesses:
 GRACE L. EDGAR,
 E. C. EDGAR.